B. PULLEN.
SAFETY GAS COUPLING DEVICE.
APPLICATION FILED JUNE 23, 1916.
1,230,026. Patented June 12, 1917.
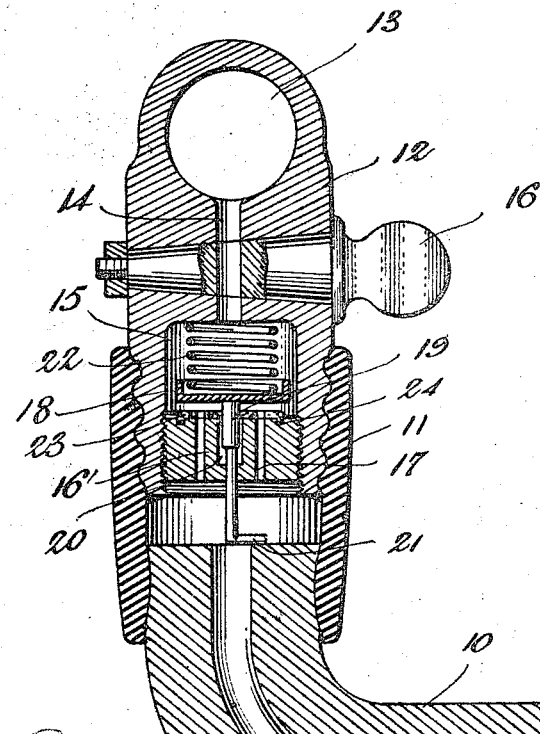
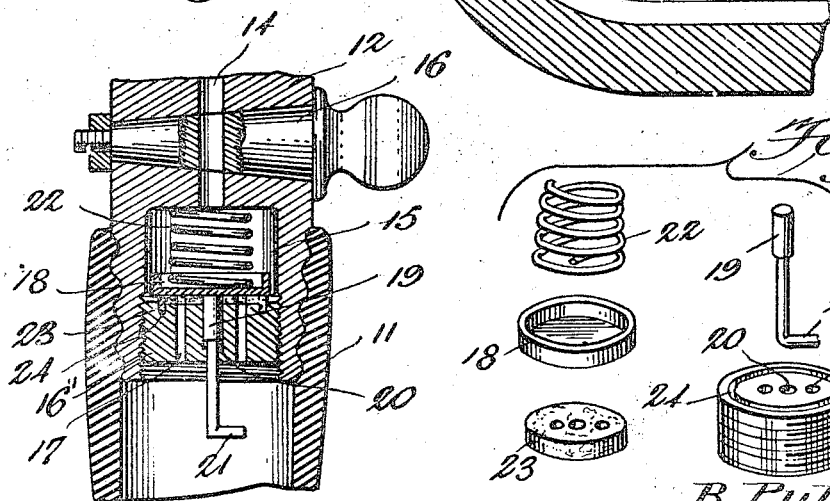
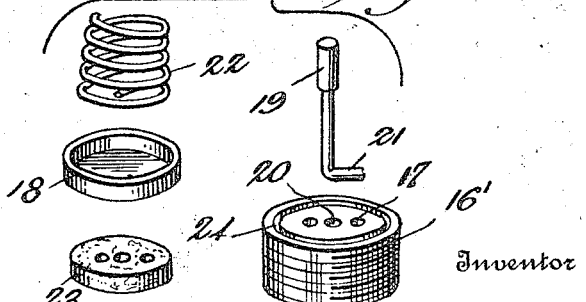

UNITED STATES PATENT OFFICE.

BARZILLAI PULLEN, OF CAMDEN, NEW JERSEY, ASSIGNOR TO ALEXANDER LECKEY, OF CAMDEN, NEW JERSEY.

SAFETY GAS-COUPLING DEVICE.

1,230,026.  Specification of Letters Patent. Patented June 12, 1917.

Application filed June 23, 1916. Serial No. 105,488.

*To all whom it may concern:*

Be it known that I, BARZILLAI PULLEN, a citizen of the United States, residing at Camden, in the county of Camden and State of New Jersey, have invented new and useful Improvements in Safety Gas-Coupling Devices, of which the following is a specification.

The invention relates to gas fixtures, couplings and attachments and has for an object to provide a coupling in a gas suppy to a stove, range, heater or fixture which will automatically shut off the flow of gas in the event that a connection, forming a part of the coupling or gas carrying conduit should become accidentally disconnected.

Among other features, the invention comprehends a valve structure that is ordinarily open to permit of the flow of gas into a tube or coupling element, the valve being automatically closed when the tube or coupling element is accidentally or otherwise disconnected and which would ordinarily result in the gas escaping into the room, thus possibly causing an explosion or endangering the occupants by asphyxiation.

In the further disclosure of the invention, reference is to be had to the accompanying drawings, constituting a part of this specification, in which similar characters of reference denote corresponding parts in all the views, and in which, Figure 1 is a fragmentary vertical sectional view showing the invention, with the valve structure in open position, Fig. 2 is a similar view showing the valve structure closed, and Fig. 3 is a perspective view showing the various details of the invention.

Referring more particularly to the views, the numeral 10 indicates a tube or other coupling element normally inserted in a sleeve 11 threaded onto a casing 12 having suitable connection with a gas supply 13, the casing 12 being provided with a passage 14 from the gas supply 13 to a valve chamber 15, a suitable cock 16 being arranged in the casing to interrupt the passage of gas through the passage 14, if desired, said cock however, being normally open. A plug 16' is threaded into the casing 12 and is formed with channels or passages 17 for the passage of the gas from the chamber 15 to the coupling element or tube 10. Arranged in the chamber 15 is a cup like valve member 18, forming a part of the valve structure, said member carrying a stem 19 extending into an opening 20 in the plug 16 and in fact, passing therethrough with the lower end of the stem reduced and bent to form a foot 21. An expansible helical spring 22 abuts against the roof of the valve chamber 15 and has its other end seated in the cup like valve member 18. A gasket 23 is seated upon the plug 16' and extends into an annular depression 24 in the top of the plug.

As shown in Fig. 1, when the tube 10 is inserted in the sleeve 11, the end of the tube abutting against the foot 21, moves the upright valve member 18 upwardly against the action of the expansible spring to uncover the ports or passages 17, and thus the gas from the gas supply 13, flowing through the passage 14 into the valve chamber 15, can continue on through the passages 17 to the tube 10. Now, if for any reason, an increased pressure of gas or an accidental pull upon the tube 10, partially or entirely removes the tube from the sleeve 11, the releasing of the foot from engaging with the tube will permit the spring 22 to act and move the cup-shaped valve member downwardly against the gasket 23 to close the ports or passages 17, thereby shutting off the flow of gas to prevent the latter from escaping into the room.

From the foregoing it will be clearly seen that the device described consists of few and simple parts; can be cheaply manufactured and will not readily get out of order, and that by providing a device of this character, the escape of gas into the room and consequent explosion or asphyxiation will be prevented.

Having thus described the invention, what is claimed is:—

1. A device of the character described, comprising a sleeve, a coupling element removably connected to the sleeve, a casing having connection with the gas supply and connected with the sleeve, a valve chamber in the casing, a plug provided with channels and disposed in the casing to effect communication between the valve chamber and coupling element, a spring actuated valve in the valve chamber for closing the channels in the plug, a stem extended from the valve, a foot on the stem and normally engaged by the coupling element to retain the valve in open position and an apertured gasket on the plug and fitting into a depression in the face thereof, the apertures in the gasket registering with said channels, said gasket forming a seat for said valve.

2. A device of the character described, comprising a sleeve, a coupling element removably connected to the sleeve, a tubular casing connected with the sleeve and to a gas supply, a valve chamber in the casing, a plug provided with longitudinal channels and threaded into the valve chamber of the casing, said channels permitting gas to flow from the valve chamber into the coupling element, a slidably mounted valve having a portion thereof extending into the valve chamber and another portion engaged by the coupling element to normally hold said valve open relative to said channels and a spring having one end abutting against a wall of the valve chamber and the other end abutting against the valve for moving the valve into closed position when the coupling element is disengaged from the valve.

In testimony whereof I affix my signature.

BARZILLAI PULLEN.